United States Patent
Dietrich (10) Patent No.: US 9,695,857 B2
(45) Date of Patent: Jul. 4, 2017

(54) SYSTEM ENABLING THE ATTACHMENT OF AN OBJECT TO AN ELEMENT HAVING ATTACHMENT GROOVE(S), AND ATTACHMENT DEVICE FOR SUCH A SYSTEM

(71) Applicant: Claude Dietrich, Weyersheim (FR)

(72) Inventor: Claude Dietrich, Weyersheim (FR)

(73) Assignee: TARIFOLD (SOCIETE PAR ACTIONS SIMPLIFIEE), Geispolsheim (FR)

( * ) Notice: Subject to any disclaimer, the term of this patent is extended or adjusted under 35 U.S.C. 154(b) by 458 days.

(21) Appl. No.: 14/366,974

(22) PCT Filed: Dec. 18, 2012

(86) PCT No.: PCT/FR2012/052966
§ 371 (c)(1),
(2) Date: Jun. 19, 2014

(87) PCT Pub. No.: WO2013/093321
PCT Pub. Date: Jun. 27, 2013

(65) Prior Publication Data
US 2014/0376997 A1   Dec. 25, 2014

(30) Foreign Application Priority Data

Dec. 19, 2011 (FR) ...................................... 11 61942

(51) Int. Cl.
*F16B 17/00* (2006.01)
*F16B 7/00* (2006.01)
(Continued)

(52) U.S. Cl.
CPC .............. *F16B 17/006* (2013.01); *F16B 7/00* (2013.01); *F16B 7/04* (2013.01); *F16B 19/10* (2013.01);
(Continued)

(58) Field of Classification Search
CPC ...... F16B 17/006; F16B 5/04; F16B 19/1081; F16B 19/10; Y10T 403/7092; Y10T 403/71; Y10T 403/7117; Y10T 403/75
See application file for complete search history.

(56) References Cited

U.S. PATENT DOCUMENTS 3,918,130 A * 11/1975 Poe ..................... F16B 19/1081
    24/297
5,409,336 A * 4/1995 Jericevich .......... A47G 25/0607
    248/231.91

(Continued)

OTHER PUBLICATIONS

International Search Report, dated Apr. 16, 2013, from corresponding PCT application.

*Primary Examiner* — Jonathan Masinick
(74) *Attorney, Agent, or Firm* — Young & Thompson (57) ABSTRACT

A system enabling the attachment of an object to an element (1) having attachment groove(s), having at least one grooved surface (2) including at least one attachment groove whose mouth (3) is defined longitudinally by two opposing edges (5) that each include an inner salient angle, the system includes an attachment device (6, 7), the element (1), and elements for coupling (8) with the object. The attachment device includes a clamping assembly and a locking element (7) capable of being at least partially inserted in the groove, directly in any of the attachment points along the latter, the assembly being at least partially resiliently or plastically deformable when exposed to a pressure bias exerted by the locking element in order to form, by deforming the material, an anchoring and clamping element capable of anchoring under the edges (5) and/or against the salient angles.

17 Claims, 8 Drawing Sheets

(51) Int. Cl.
*F16B 19/10* (2006.01)
*F16B 7/04* (2006.01)
(52) U.S. Cl.
CPC ..... *F16B 19/1081* (2013.01); *Y10T 403/4949* (2015.01)

(56) References Cited

U.S. PATENT DOCUMENTS

| | | | | |
|---|---|---|---|---|
| 5,507,545 | A * | 4/1996 | Krysiak | B60J 3/023 24/453 |
| 5,560,575 | A * | 10/1996 | Krysiak | F16B 19/1081 248/222.12 |
| 5,628,581 | A | 5/1997 | Hintz et al. | |
| 5,632,581 | A * | 5/1997 | Hasada | F16B 19/1081 411/48 |
| 6,398,295 | B2 * | 6/2002 | Asai | B60N 2/39 180/89.14 |
| 6,955,514 | B2 * | 10/2005 | Hoshi | F16B 5/065 24/297 |
| 7,105,119 | B2 * | 9/2006 | Kanie | F16B 19/1081 264/238 |
| 7,207,759 | B2 * | 4/2007 | Kato | F16B 19/1081 411/41 |
| 7,677,850 | B2 * | 3/2010 | Sano | F16B 19/1081 16/2.1 |
| 8,348,568 | B2 * | 1/2013 | Murakami | F16B 19/1081 411/44 |

\* cited by examiner

SYSTEM ENABLING THE ATTACHMENT OF AN OBJECT TO AN ELEMENT HAVING ATTACHMENT GROOVE(S), AND ATTACHMENT DEVICE FOR SUCH A SYSTEM

This invention relates to the field of systems that make possible the attachment of an object to an element having attachment groove(s), more particularly an extruded shape having attachment groove(s), this from an attachment device associated with means for connecting with the object and adapted to work, for the purpose of achieving the attachment, with the groove or one of the grooves of said element, and it has as its object a system that makes possible the attachment of an object to an element having attachment groove(s). It also has as its object an attachment device for such a system.

BACKGROUND OF THE INVENTION

Field of the Invention

The extruded shapes having attachment groove(s) are intended to form various structures such as, for example, machine stands or partition walls and of which each attachment groove is adapted to make possible the attachment of an object, for example an accessory, to the extruded shape concerned, this by means of an attachment device, generally a bolt, attached in said groove and associated with means for connecting with the object.

This type of extruded shape is generally made of light metal, more particularly of aluminum, and appears in the form of a hollow and elongated element such as a hollow bar with a cross-section that is usually square or rectangular or mixed. It comprises at least one approximately plane grooved face comprising at least one attachment groove, known by the name of T-groove, whose mouth, which opens on a channel that is made or hollowed out in said extruded shape, is delimited longitudinally by two edges facing each other that each comprise an internal salient angle formed by two internal faces that are approximately perpendicular to one another, namely a first internal face that is approximately parallel to said grooved face and that extends from the side of the bottom of the groove and a second internal face that extends to the level of the mouth of the groove that is approximately perpendicular to said first internal face. The external face of each edge of the groove is flush with the grooved face and is opposite the first internal face.

The placing of the bolt in the T-shaped attachment groove is generally performed by engaging the nut through one of the ends of the attachment groove and having it slide along the latter, thanks to the bolt that is integral with it and that protrudes beyond the groove to the outside of the extruded shape, as far as the attachment point selected along said groove.

The bolt is then held securely at the selected attachment point in the attachment groove by tightening the nut that has a clamping surface that is supported by tightening, under said edges, against their first internal face and of the bolt head that has a clamping surface that is supported against the external face of said edges and/or against the grooved face.

The object is then attached to the extruded shape thanks to a connecting part that is integrated or not in the object or a connecting piece that is attached to the latter, said connecting part or piece generally having an opening that makes it possible to screw the bolt that is fixed securely in the groove at the selected attachment point.

However, if these bolt/nut attachment systems offer a solid locking of the attachment device, the positioning of a nut in the groove or one of the attachment grooves of an extruded shape poses several problems. First of all, it frequently happens that the nuts fall into the attachment groove and cannot be recovered. On the other hand, this attachment method necessitates specific tools and, in general, the presence of two individuals, one to hold the extruded shape and the other to hold the bolt at the selected attachment point, and the time to perform the clamping operation locking said bolt at the selected attachment point.

BRIEF SUMMARY OF THE INVENTION

This invention has as its object to remedy these drawbacks by proposing a system that makes possible the attachment of an object to an element having attachment groove(s), more particularly an extruded shape having attachment groove(s), which can be positioned easily in the groove or one of said grooves, this particularly by a single individual, directly at any attachment point along the attachment groove concerned.

For this purpose, the system according to this invention, which makes possible the attachment of an object to an element having attachment groove(s) exhibiting at least one grooved face comprising at least one attachment groove, whose mouth, opening on a channel that is made or hollowed out in said element, is delimited longitudinally by two edges facing each other, said system comprising an attachment device that serves in the attachment of the object to said element, said element and means for connecting with the object being associated with said device, each edge comprising an internal salient angle formed by two internal faces, is characterized essentially in that said device comprises a clamping assembly and locking means able to be, at least in part, inserted into said groove directly at any attachment point along the latter, said assembly, on the one hand, comprising a clamping surface able, in the insertion state, to be thrust, directly or indirectly, against said grooved face and, on the other hand, being at least in part elastically or plastically deformable so as to form anchoring and clamping means resulting from the elastic or plastic deformation of the material under the effect of a pressure stress exerted, in the insertion state, by said means for locking on said assembly, said anchoring and clamping means being able to be anchored under said edges and/or against said internal salient angles so as to clamp said edges between the clamping surface and the anchoring and clamping means to secure said assembly at the selected attachment point and in that said connecting means are either incorporated into the clamping assembly, or added by being able to be attached to said assembly or locked by clamping between said clamping surface and said grooved face.

This invention also has as its object an attachment device for a system making possible the attachment of an object to an element having attachment groove(s) that is characterized essentially in that it consists of an attachment device as defined in the system according to this invention.

BRIEF DESCRIPTION OF THE DRAWINGS

The invention will be better understood thanks to the following description, which is related to a preferred embodiment, given by way of nonlimiting example, and explained with reference to the accompanying diagrammatic drawings in which.

DETAILED DESCRIPTION OF THE PREFERRED EMBODIMENTS

The figures show a system making possible the attachment of an object to an element 1 having attachment groove(s), more particularly an extruded shape having attachment groove(s), said element exhibiting at least one grooved face 2, preferably approximately plane, comprising at least one attachment groove 3, 4, whose mouth 3, opening on a channel 4 that is made or hollowed out in said extruded shape 1, is delimited longitudinally by two edges 5 facing each other, said system comprising an attachment device 6, 7 that serves in the attachment of the object, said element 1 and means 6', 8 for connecting with the object being associated with said device, each edge 5 comprising an internal salient angle formed by two internal faces 9 and 9', preferably approximately perpendicular to one another.

In accordance with this invention, said attachment device comprises a clamping assembly 6 and locking means 7, which assembly and which locking means are able to be, in an insertion state, at least in part, inserted into said groove 3, 4 directly at any attachment point along the latter.

Figure 1A:
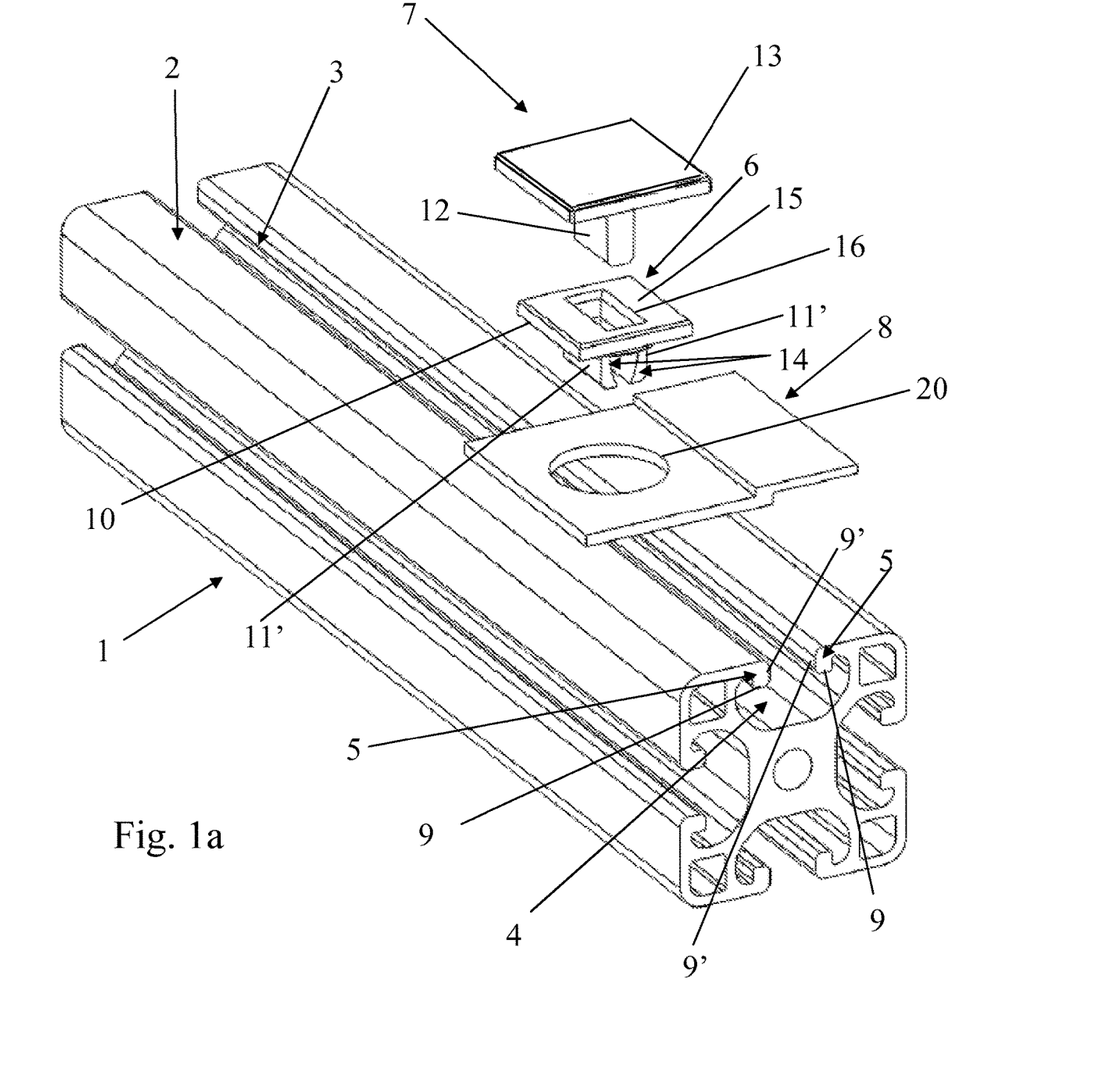
FIG. 1a shows a view in perspective of a system, according to this invention, in a preferred embodiment, and in attachment phase of the attachment device in one of the attachment grooves of an extruded shape having attachment grooves, with a connecting piece added.
Figure 1B:
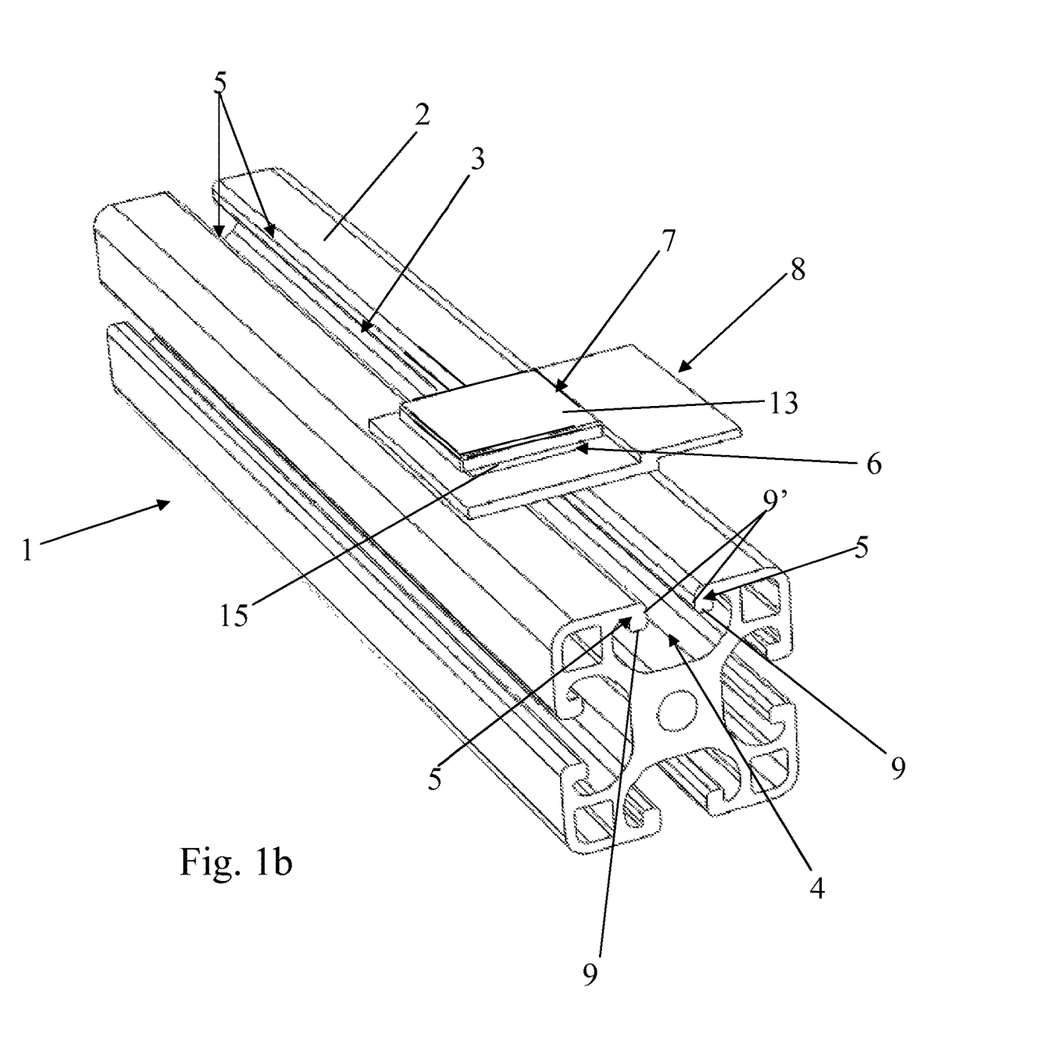
FIG. 1b shows a view in perspective of the system represented in FIG. 1a, in the state of attachment of the attachment device in the concerned attachment groove of the extruded shape with clamping and locking of the connecting piece against the corresponding grooved face of said extruded shape.
Figure 2A:
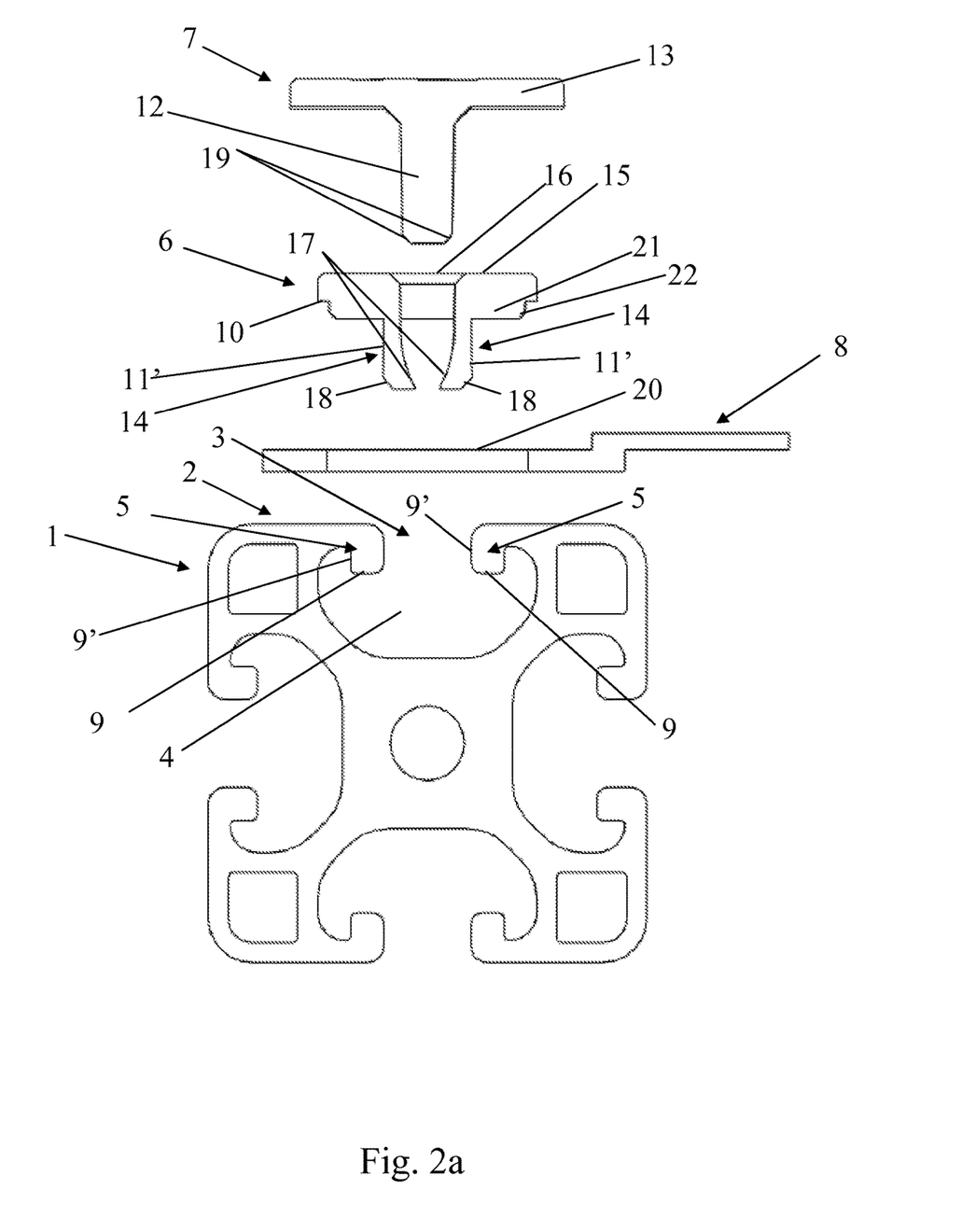
FIG. 2a shows a view in cross-section of the attachment device, of the connecting piece and of the extruded shape that are represented in FIG. 1a, FIG. 2b shows a view in cross-section of the attachment device, of the connecting piece and of the extruded shape that are represented in FIG. 1b.
Figure 2B:
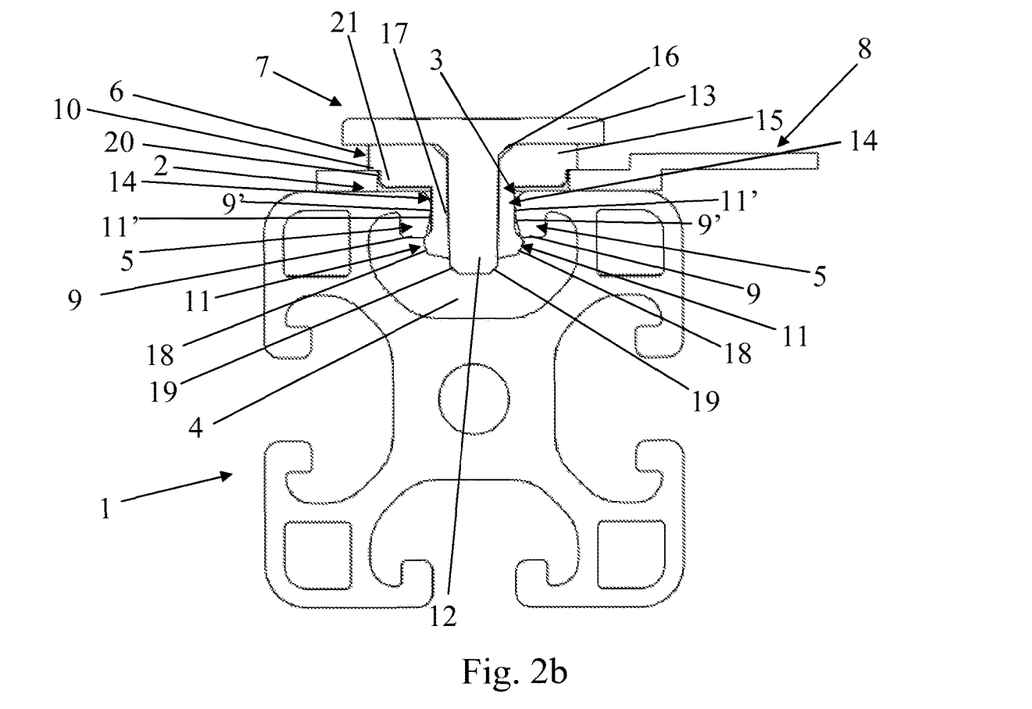

Still in accordance with this invention, the clamping assembly 6, on the one hand, comprises a clamping surface 10 able, directly or indirectly, in the insertion state, to be thrust against said grooved face and, on the other hand, is at least in part elastically or plastically deformable so as to form anchoring and clamping means 11 resulting from the elastic or plastic deformation of the material under the effect of a pressure stress exerted, in the insertion state, by said means for locking 7 on said assembly, said anchoring and clamping means 11 being able to be anchored under said edges 5 and/or against the internal salient angles so as to clamp the edges 5 between the clamping surface 10 and the anchoring and clamping means 11 to secure said assembly at the selected attachment point (FIGS. 1b and 2b).

Still in accordance with this invention, the connecting means 6', 8 are either incorporated into the clamping assembly 6 (FIGS. 8 and 9), or added by being able to be attached to said assembly or locked by clamping between said clamping surface and said grooved face 2 (FIGS. 1a, 1b, 2a, 2b and 10).

In a preferred embodiment, the clamping assembly 6 can consist of a single unit clamping piece and/or said locking means 7 can consist of a single unit locking piece.

Preferably, the internal salient angle of each edge 5 can be formed by a first internal face 9 extending, on the side of the bottom of the groove, approximately parallel to said grooved face and a second internal face 9' extending, at the site of the mouth of the groove, preferably approximately perpendicular to said first internal face 9, and the clamping piece 6 can further comprise two stop faces 11' that each can, in the insertion state, be thrust against the second internal face 9' of one of the edges 5.

Furthermore, this invention can foresee, in an advantageous way, that the two stop faces 11' are each able, in the insertion state, to be thrust—with holding of pressure by the locking piece 7—against the second internal face 9' of one of the edges 5, i.e., under the effect of the stress or of the applied force exerted by said locking piece 7, this so as to lock the clamping piece more effectively and to prevent, because of the hold of pressure, particularly, its sliding along the groove.

In a preferred embodiment of the locking piece 7, the latter can comprise a stress and locking element 12, preferably rigid, for example in the form of a pin or plate that can ensure the stress of locking, and, optionally, of the means for grasping 13 the latter.

In a preferred embodiment of the clamping piece 6, the latter can comprise, on the one hand, two flexible anchoring wings or lugs 14 that are spaced and located approximately opposite one another and adapted so as, in the insertion state, to extend approximately up to the level or beyond the salient angles of said edges 5 toward the bottom of said groove, each anchoring wing 14 being at least elastically or plastically deformable at its free end part and, on the other hand, a cap 15 that incorporates the clamping surface 10 and that supports the anchoring wings 14 that can, preferably, extend approximately perpendicular to the latter.

Moreover, the cap 15 can also have a passage opening 16 go through it that comes out between the anchoring wings 14 and that makes possible, in the insertion state, the passing through and the engagement of the stress and locking element 12 between said anchoring wings 14 so that the latter exerts a pressure force on at least one contact zone 17 of each anchoring wing 14 that tends to separate said wings from one another while pressing them each against one of said salient angles, which has the effect of deforming their free end part, whose elastic or plastic deformation of the material then forms said anchoring and clamping means 11 (FIG. 2b).

Therefore, it should be understood that the deformation of the material of each anchoring wing 14 can then form a rim of material that becomes anchored under said edge 5, i.e., against the internal face of the edge located opposite the bottom of the groove and/or against the internal salient angle of said edge so as to achieve the clamping of each edge 5 between the clamping surface 10 and the anchoring and clamping means 11 formed by said rims or deformation of material, for the purpose of attaching the latter to the selected attachment point of the groove by clamping, with locking, of the clamping assembly 6 on the edges 5.

In a preferred embodiment, the clamping piece 6 can have an overall π-shaped profile, whose two vertical legs of the it can constitute the two anchoring wings 14 and the horizontal rail of the it can constitute the cap 15 that can have a platform or plate shape and one of whose large faces or internal face of the cap can form, at least in part, the clamping surface 10.

It should be understood that the clamping surface 10 will be able to extend approximately perpendicular in relation to said anchoring wings 14 that will be able to be attached to the internal face of the cap that incorporates said clamping surface 10.

On the other hand, according to this invention, the clamping surface 10 can be continuous or made of a plurality of clamping surfaces that extend approximately in the same plane or the same approximately plane surface.

Each anchoring wing 14 can have an overall rectangular parallelepiped shape and can extend approximately parallel to the other anchoring wing 14. Furthermore, each anchoring wing 14 can have two opposite sides, namely an internal side that faces one of the sides of the other anchoring wing 14 and an external side opposite said internal side. On the other hand, each internal side of an anchoring wing 14 can have a surface that is curved toward the internal side of the other anchoring wing 14 so as to form one of the contact zones 17. Still furthermore, the external side of each anchoring wing 14 can constitute, when applicable, at least in part, one of the two stop faces 11'.

Equally, each internal side of an anchoring wing 14 can have a surface exhibiting any deformation or any curve that makes it possible to work with the stress and locking element 12 for the purpose of separating the anchoring wings 14 to exert a pressure on each edge 5 of said wings.

Thus, the clamping piece 6 can be locked effectively in the groove by clamping on the edges 5 each taken between the clamping surface 10 and the anchoring and clamping means 11 that are thus deformed and by thrusting each stop face 11' against the second internal face 9' of the corresponding edge 5, all while being locked in clamping position thanks to the locking piece 7 that ensures the hold by anchoring and clamping pressure of the anchoring wings 14 against the edges 5 and, when applicable, the hold by pressure and by thrust of the latter against the second internal faces 9' of said edges 5.

Figure 3:
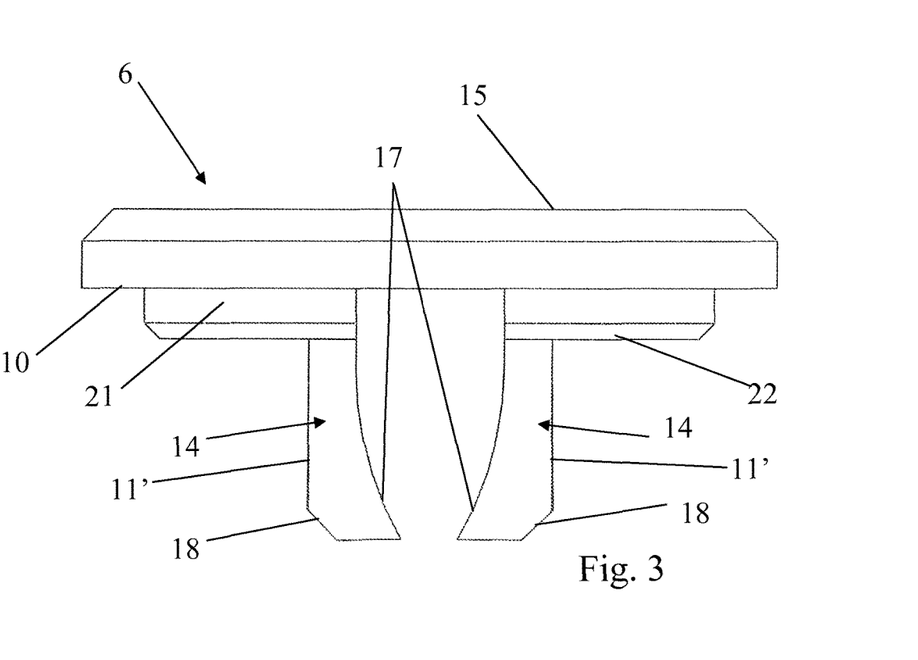
FIG. 3 shows a profile view of the clamping piece of the attachment device represented in FIG. 1.
Figure 4:
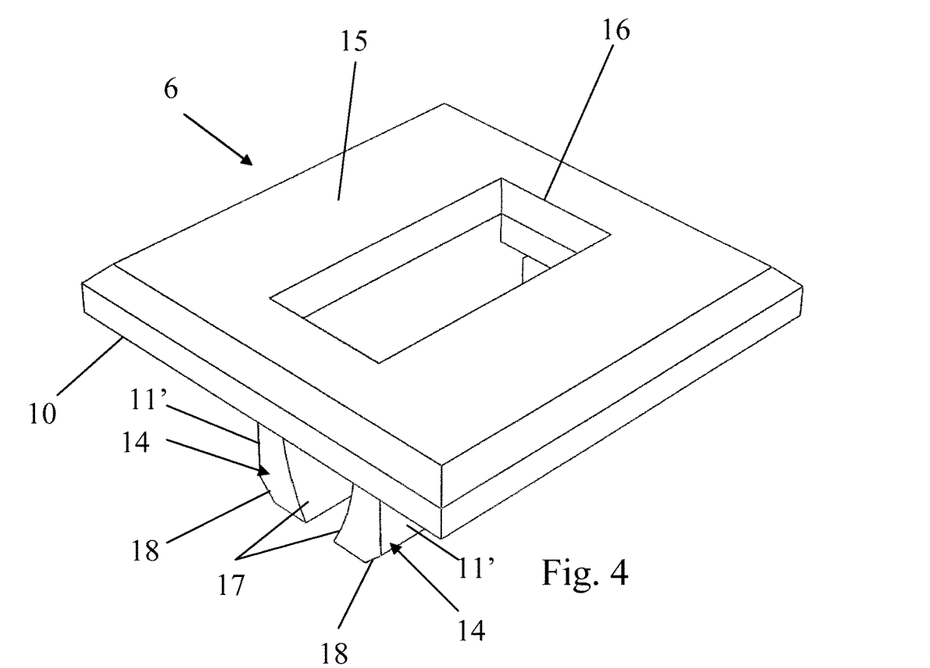
FIG. 4 shows a view in perspective of the clamping piece represented in FIG. 3.
Figure 5:
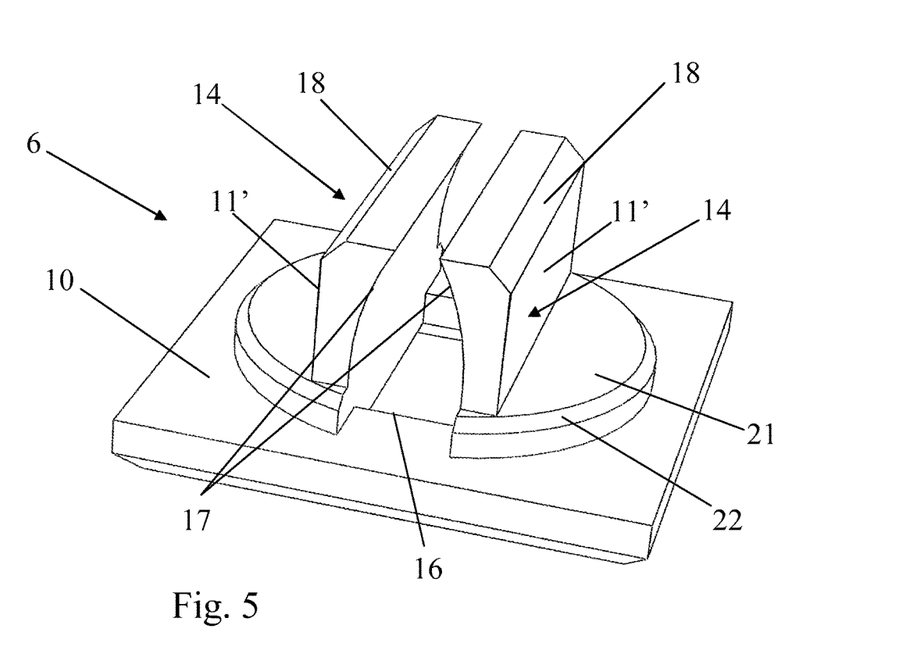
FIG. 5 shows a view in perspective of the clamping piece represented in FIG. 4 in an inverted orientation.

Furthermore, if reference is made in particular to FIGS. 3 to 5, it can be seen that the edge 18 of the free end of each anchoring wing 14 can be beveled or chamfered so as to make it possible, on the one hand, to facilitate the introduction or the insertion of the clamping piece 6 in the groove 3, 4 concerned and, on the other hand, to facilitate the elastic or plastic deformation of the material that can form the anchoring and clamping means 11. Such beveled or chamfered edges 18 also make it possible to reduce the weight of the material and therefore to reduce the manufacturing cost of the clamping piece 6.

Figure 6:
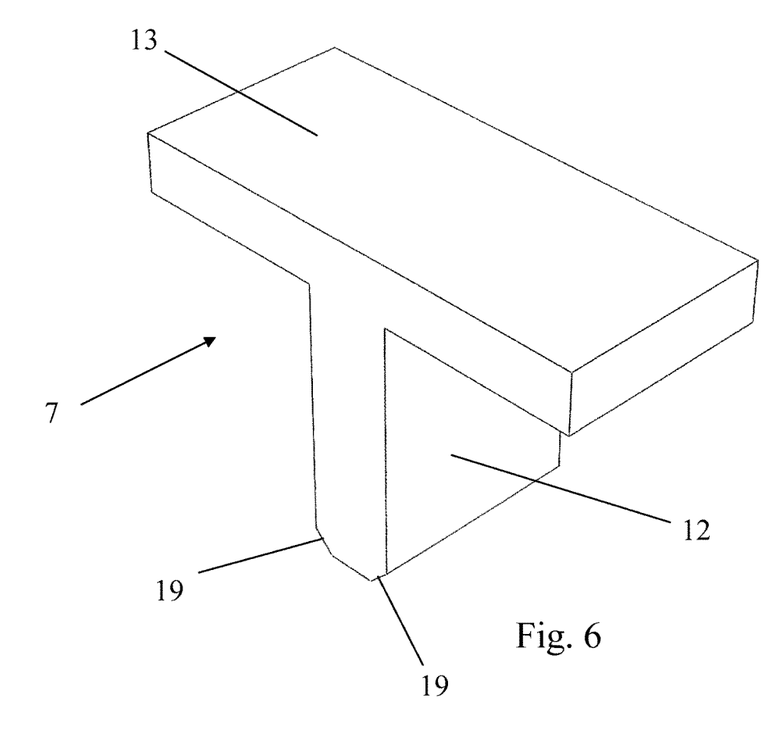
FIG. 6 shows a view in perspective of the locking piece of the attachment device represented in FIG. 1.
Figure 7:
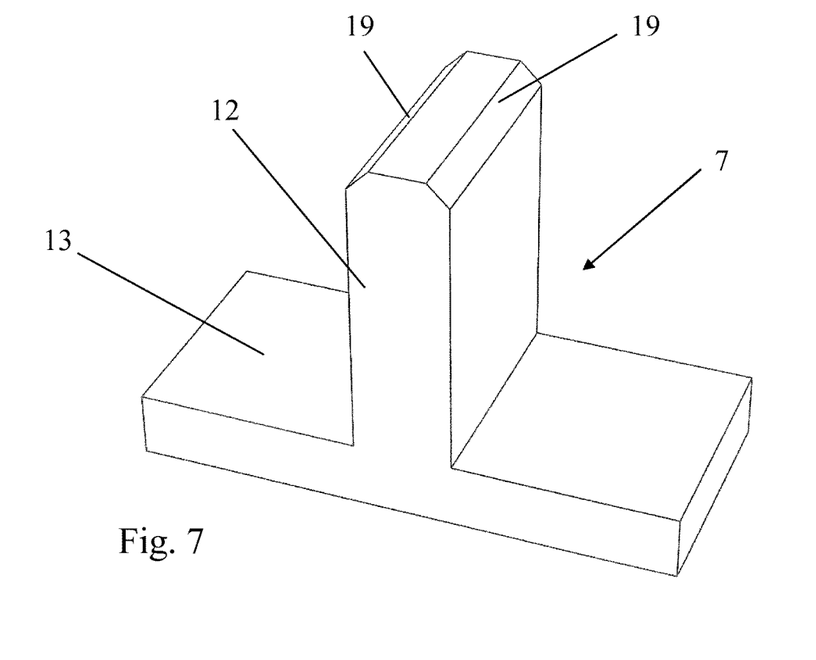
FIG. 7 shows a view in perspective of the locking piece represented in FIG. 6 in an inverted orientation.

In a preferred form of the locking piece 7, the latter can have a T-shaped profile, whose vertical leg of the T can constitute the stress and locking element 12, while the horizontal rail of the T can constitute the gripping means 13 (FIGS. 6 and 7).

It can also be seen in FIGS. 6 and 7 that the stress and locking element 12 of the locking piece 7 can have an overall rectangular parallelepiped shape and can have at its free end edge a bevel 19 so as to facilitate the introduction or the engagement of said stress and locking element 12 in the passage opening 16 of the clamping piece 6 that can also have a beveled or chamfered opening entry edge.

In the case where the connecting means are added, the latter can consist of a connecting piece 8 that can be locked by clamping between the clamping surface 10 and the grooved face 2, and the connecting piece 8 can have a hole 20 pass through it that makes possible, in the insertion state, the passing through of the anchoring wings 14 and of the stress element 12 for the purpose of engaging it between said wings 14, this so as to lock said connecting piece or part by wedging and clamping between the clamping surface 10 and said grooved face (FIG. 2b). In a preferred embodiment of the connecting piece 8, the latter can have overall the shape of a plate or platform through which the hole 20 passes (FIGS. 1a, 1b, 2a, 2b and 10).

Also, this invention can foresee that the clamping piece 6 has a fitting and centering means 21, 22 that can be inserted into the hole 20 of the connecting piece or part 8 (FIG. 2b).

The fitting and centering means 21, 22 can consist of an added thickness of the clamping surface 10, the latter being able to be extended around said added thickness. Furthermore, the added thickness can have the passage opening 16 go through it, and the anchoring wings 14 can be attached to said added thickness on both sides of said passage opening 16, and, preferably, near the latter (FIG. 3 and FIG. 5).

The fitting and centering means 21, 22 can have a chamfered edge 22 so as to facilitate its engagement in the hole 20 of the connecting piece or part 8.

Figure 8:
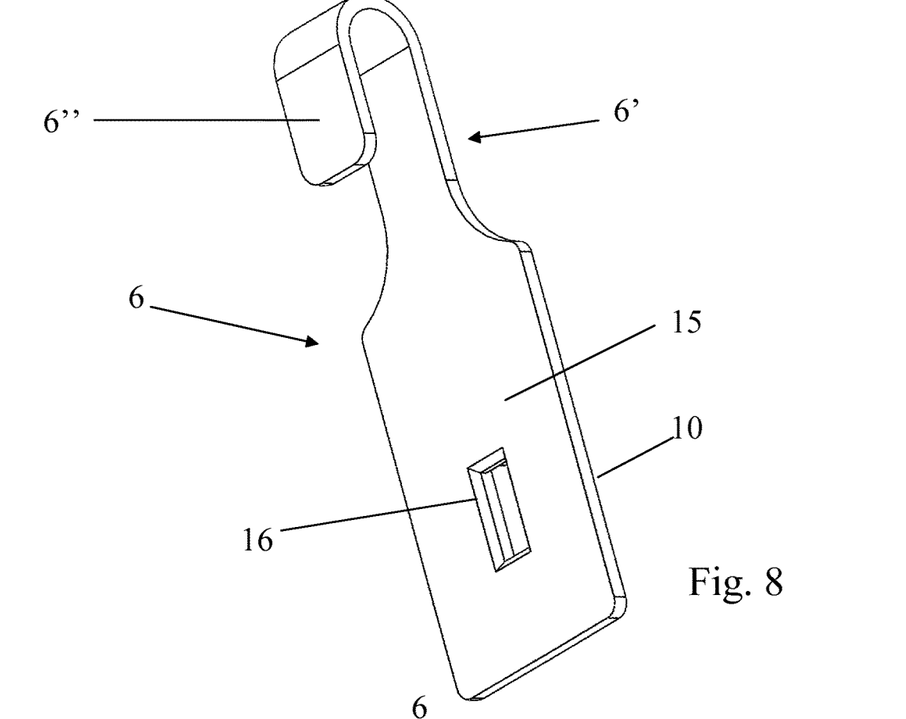
FIG. 8 shows a view in perspective of the clamping piece and of the hook-shaped connecting means that are incorporated in said piece.
Figure 9:
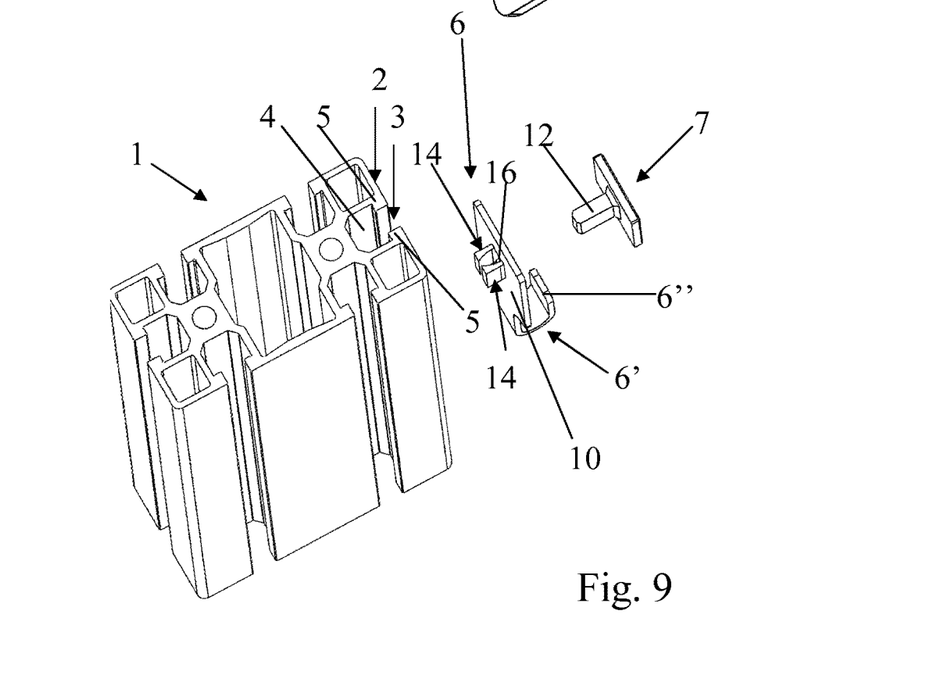
FIG. 9 shows a view in perspective of the device comprising the clamping piece and the connecting means that are incorporated in the latter represented in FIG. 8.
Figure 10:
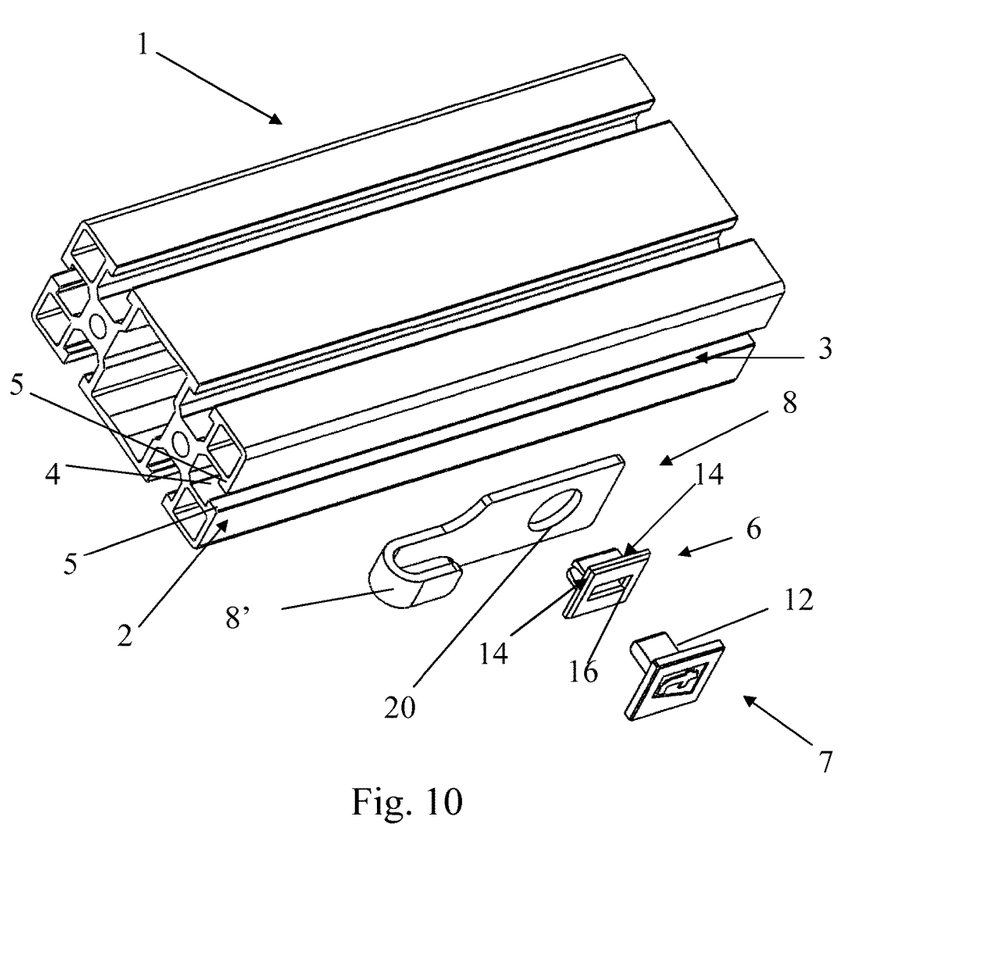
FIG. 10 shows a view in perspective of a system, according to this invention in attachment phase of the attachment device in one of the attachment grooves of an extruded shape having attachment grooves, with an added connecting piece provided with a hook.

In the case where the connecting means are incorporated into the clamping piece 6, the latter can consist of a connecting part 6' provided with a connecting element such as, for example, a hook 6" (FIGS. 8 and 9).

When applicable, in the case where the connecting means are added and consist of a connecting piece 8 that can either be attached to the clamping piece 6, for example by welding or screwing, or be locked by clamping as seen previously, the connecting piece 8 can be provided with a connecting element such as, for example, a hook 8' (FIG. 10) (FIGS. 1a, 1b, 2a and 2b).

It should be noted that the connecting piece 8 or other connecting means that is added can be incorporated into the object.

Preferably, the opening 16 can have a section, for example rectangular, approximately identical and with dimensions that are slightly greater than those of the stress and locking element 12, for example of rectangular parallelepiped shape.

This invention also has as its object an attachment device for a system that makes possible the attachment of an object to an element 1 having attachment groove(s), more particularly an extruded shape having attachment groove(s).

In accordance with this invention, said attachment device consists of an attachment device as defined in the system according to this invention.

Of course, the invention is not limited to the embodiment described and represented in the accompanying drawings. Modifications remain possible, particularly from the viewpoint of the composition of the various elements or by substitution of equivalent techniques, without thereby going outside the scope of protection of the invention.

The invention claimed is:

1. A system for attaching an object, the system comprising:

an element (1) having at least one grooved face (2) and at least one attachment groove, the at least one attachment groove comprising a mouth (3) opening on a channel (4) extending longitudinally in said element (1), wherein the mouth (3) is delimited longitudinally by two edges (5) facing each other, each of the two edges (5) comprising an internal salient angle formed by a first internal face (9) extending, on a side of a bottom of the at least one attachment groove, approximately parallel to said grooved face and an adjacent, second internal face (9') extending, at the mouth (3), approximately perpendicular to said first internal face;

a connecting piece (6'; 8) for connecting with the object, the connecting piece having a first face and an opposite, second face;

a clamping piece (6), the clamping piece (6) comprising a first face, and an opposite second face (15) with passage opening (16), and two stop faces (11') extending from the first face; and a locking piece (7), wherein, in an insertion state, with i) the first face of the connecting piece (6'; 8) against the at least one grooved face (2), and the second face of the connecting piece (6'; 8) against the first face of the clamping piece (6), ii) the locking piece (7) inserted in the passage opening (16), iii) the two stop faces (11') passing through the connecting piece (6'; 8), and iv) the locking piece (7) pressed against the second face (15) of the clamping piece (6), the locking piece (7) presses the two stop faces (11') against the second internal face (9') of each of the two edges (5) under an effect of stress exerted by said locking piece (7) to thereby secure said connecting piece (6'; 8) to said element (1) and prevent sliding along said at least one attachment groove, and wherein at least one of the group consisting of the clamping piece (6) the locking piece (7) is a single unit locking unit piece.

2. System, according to claim 1, wherein the locking piece (7) comprises a stress and locking element (12) that, in the insertion state, passes through the connecting piece (6'; 8), and presses the two stop faces (11') against the second internal face (9') of each of the two edges (5) to thereby provide the effect of stress exerted by said locking piece (7) to thereby secure said connecting piece (6'; 8) to said element (1), and further comprises a grip (13), and wherein the clamping piece (6) comprises i) two flexible anchoring wings (14) that are spaced and located approximately opposite one another and adapted so as, in the insertion state, to extend up to a level or beyond the salient angles of said two edges (5) toward the bottom of said at least one attachment groove, each anchoring wing (14) being at least elastically or plastically deformable at a free end part thereof and ii) a cap (15) that incorporates a clamping surface (10) and that supports said anchoring wings (14), said cap (15) also having the passage opening (16), the passage opening (16) go through going through the cap (15) and coming out between said anchoring wings (14) so that the cap exerts a pressure force on at least one contact zone (17) of each anchoring wing (14) that tends to separate said wings from one another while pressing said wings each against one of said salient angles, which has the effect of deforming the free end part.

3. System, according to claim 2, wherein the clamping piece (6) has an overall π-shaped profile, where two vertical legs of the π-shaped constitute the two anchoring wings (14) and a horizontal rail of the π-shaped constitutes the cap (15) the horizontal rail, at least in part, forming the clamping surface (10).

4. System, according to claim 3, wherein each anchoring wing (14) has an overall rectangular parallelepiped shape when an internal side is considered a face of the parallelepiped shape, and wherein each anchoring wing (14) extends approximately parallel to the other anchoring wing (14), each anchoring wing (14) having two opposite sides, namely the internal side that faces one of the sides of the other anchoring wing (14) and an external side opposite said internal side and wherein each internal side of an anchoring wing (14) has a surface that is curved toward the internal side of the other anchoring wing (14) so as to form one of the contact surfaces (17) and wherein the external side of each anchoring wing (14) constitutes, when applicable, at least in part, one of the two stop faces (11').

5. System, according to claim 4, wherein an edge (18) of the free end of each anchoring wing (14) is beveled or chamfered.

6. System, according to claim 2, wherein the locking piece (7) has a T-shaped profile, whose vertical leg of the T constitutes the stress and locking element (12), while the horizontal rail of the T constitutes the gripping means (13).

7. System, according to claim 2, wherein the connecting piece (8) comprises a hole (20) allowing, in the insertion state, the anchoring wings (14) to pass through so as to lock said connecting piece by wedging and clamping between the clamping surface (10) and said at least one grooved face (2).

8. System, according to claim 7, wherein the connecting piece (8) has overall the shape of a plate or platform through which the hole (20) passes and wherein the clamping piece (6) has a fitting and centering part (21, 22) that is insertable into said hole (20).

9. System, according to claim 8, wherein the fitting and centering part (21, 22) comprises an added thickness of the clamping surface (10), the clamping surface extending around said added thickness, and wherein the passage opening (16) extends through said added thickness, the anchoring wings (14) being attached to said added thickness on both sides of said passage opening (16).

10. System, according to claim 9, wherein the fitting and centering part (21, 22) has a chamfered edge (22) so as to facilitate engagement in the hole (20) of the connecting piece (8).

11. System, according to claim 8, wherein the fitting and centering part (21, 22) has a chamfered edge (22) so as to facilitate engagement in the hole (20) of the connecting piece (8).

12. System, according to claim 1, wherein the clamping piece (6) comprises a hook (6").

13. System, according to claim 1, wherein the clamping piece (6) is a single unit clamping piece and the locking piece (7) is a single unit locking piece.

14. System, according to claim 1, wherein the clamping piece (6) is single unit clamping piece.

15. System, according to claim 1, wherein the locking piece (7) is a single unit locking piece.

16. System, according to claim 1, wherein the connecting piece (8) comprises a hook (8').

17. A system for attaching an object, the system comprising:

an element (1) having at least one grooved face (2) and at least one attachment groove, the at least one attachment groove comprising a mouth (3) opening on a channel (4) extending longitudinally in said element (1), wherein the mouth (3) is delimited longitudinally by two edges (5) facing each other, each of the two edges (5) comprising an internal salient angle formed by i) a first internal face (9) extending, on a side of a bottom of the at least one attachment groove, approximately parallel to said grooved face and ii) an adjacent, second internal face (9') extending, at the mouth (3), approximately perpendicular to said first internal face; a connecting piece (6'; 8) for connecting with the object, the connecting piece having a first face and an opposite second face;

a clamping piece (6), the clamping piece (6) comprising a first face, and an opposite second face (15) with passage opening (16), and two spaced-apart flexible anchoring wings (14) extending from the first face, each anchoring wing (14) having a free end, each anchoring wing (14) having a stop face (11') extending from the first face; and a locking piece (7), wherein, in an insertion state, with i) the first face of the connecting piece (6'; 8) against the at least one grooved face (2), and the second face of the connecting piece (6'; 8) against the first face of the clamping piece (6), ii) the locking piece (7) inserted in the passage opening (16), iii) the two anchoring wings (14) passing through the connecting piece (6'; 8), and iv) the locking piece (7) pressed against the second face (15) of the clamping piece (6), the locking piece (7) presses the two anchoring wings and thereby presses the two stop faces (11') against the second internal face (9') of each of the two edges (5) under an effect of stress exerted by said locking piece (7) to thereby secure said connecting piece (6'; 8) to said element (1) and prevent sliding along said at least one attachment groove, and wherein at least one of the group consisting of the clamping piece (6) and the locking piece (7) is a single unit locking unit piece.

* * * * *